Nov. 11, 1924.

A. E. NORRIS

FRICTION CLUTCH

Filed Sept. 20, 1921

Inventor:
Almon E. Norris,
by Emery, Booth, Janney & Varney.
Attys.

Nov. 11, 1924.
A. E. NORRIS
1,515,402
FRICTION CLUTCH
Filed Sept. 20, 1921
2 Sheets-Sheet 2
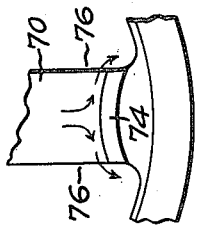
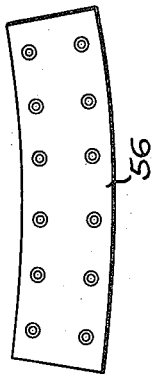
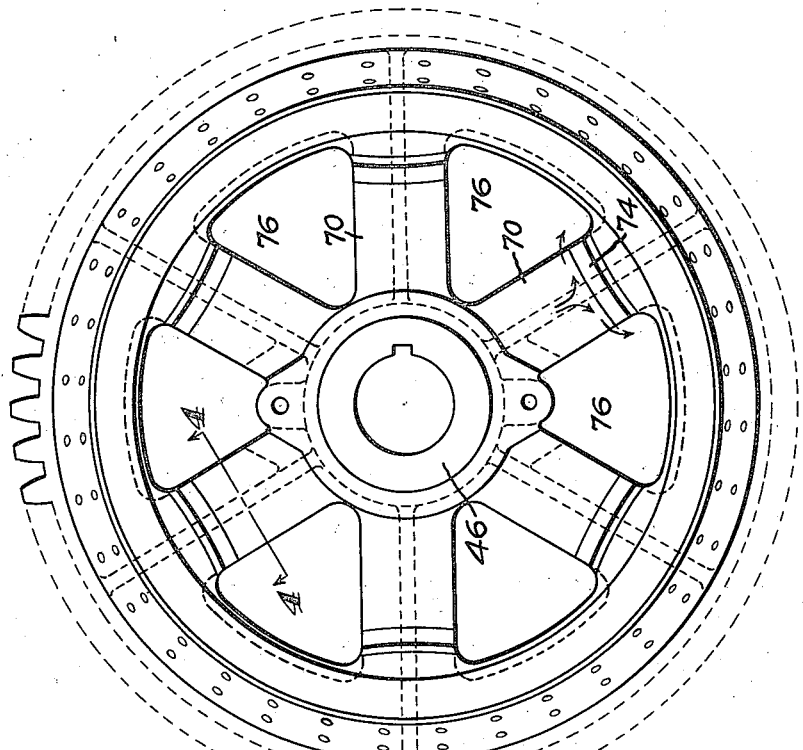

Patented Nov. 11, 1924.

1,515,402

UNITED STATES PATENT OFFICE.

ALMON E. NORRIS, OF BROOKLINE, MASSACHUSETTS.

FRICTION CLUTCH.

Application filed September 20, 1921. Serial No. 501,924.

*To all whom it may concern:*

Be it known that I, ALMON E. NORRIS, a citizen of the United States, and a resident of Brookline, in the county of Norfolk and State of Massachusetts, have invented an Improvement in Friction Clutches, of which the following description, in connection with the accompanying drawings, is a specification, like characters on the drawings representing like parts.

This invention relates to friction clutches and is more particularly concerned with clutches of the class employed in connection with the rope winding drums of hoisting engines and the like. The invention aims to facilitate the renewal of the lining material of the friction surfaces of the clutch members, and to prevent oil and grease from being thrown out onto such surfaces from the bearings.

The invention will be best understood by reference to the following description, when taken in connection with the accompanying drawings of one specific embodiment thereof, while its scope will be more particularly pointed out in the appended claims.

In the drawings:

Fig. 2 is an end elevation of the inner member of the clutch as viewed from the right-hand side thereof considered with reference to Fig. 1;

Fig. 3 is a true elevation of one of the spokes shown in Fig. 2;

Fig. 4 is a sectional view on line 4—4 of Fig. 2; and

Fig. 5 is a development of one section of the clutch lining or facing.

Figure 1:
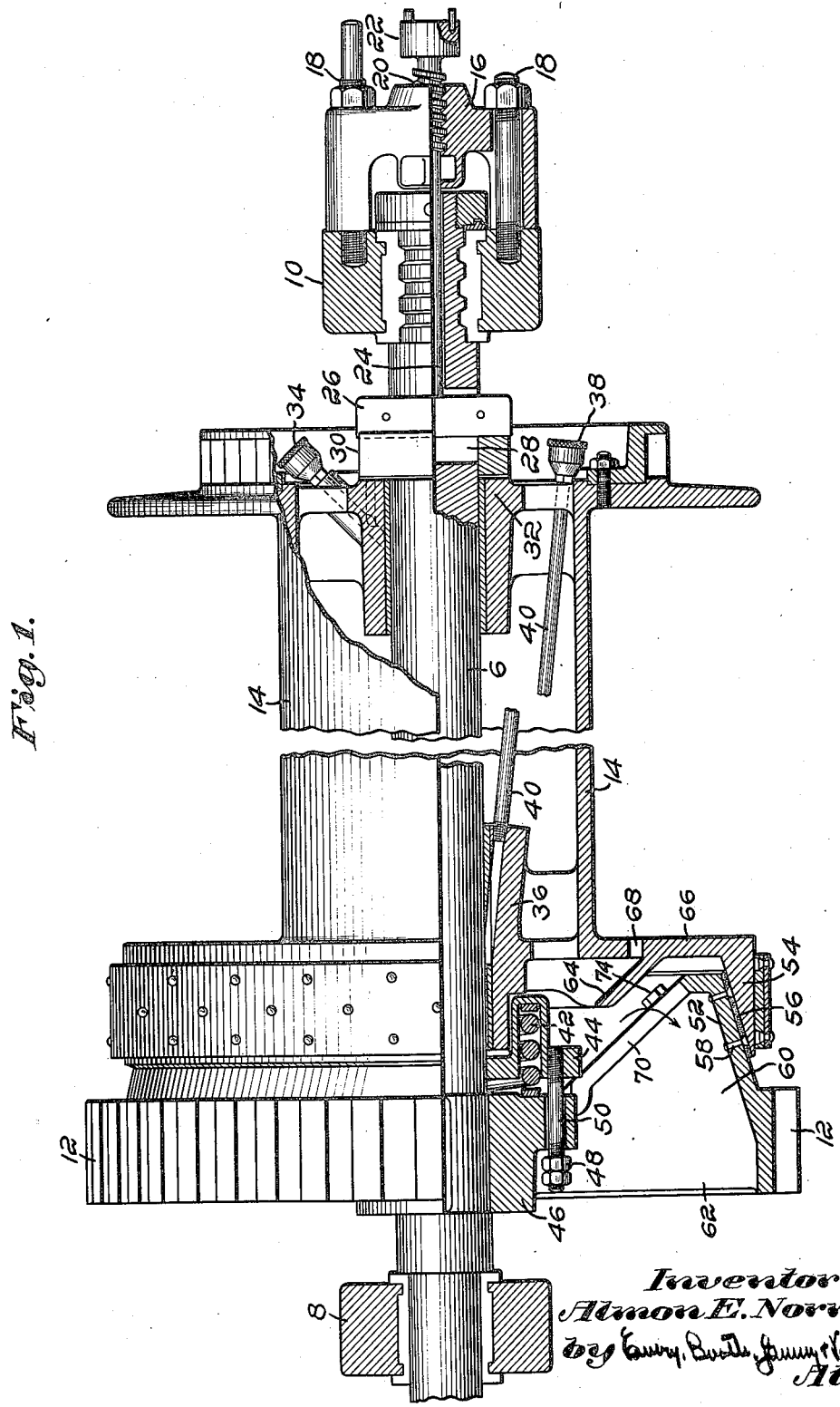
Fig. 1 is an elevation, partly in central longitudinal section, of a rope winding drum having a friction clutch exemplifying the invention.

Referring to the drawings and to the embodiment of the invention which is selected for exemplification there is shown a shaft 6 mounted in bearings 8 and 10. To the shaft is keyed a gear 12, usually driven by a pinion which in turn is driven by the crank shaft of the hoisting engine, the pinion and crank shaft, however, not being shown herein as they have nothing to do with the present invention. Loosely mounted on the shaft is a rope winding drum 14 which is free to slide axially in one direction under the influence of any usual actuating means, such as that which is disclosed in United States Letters Patent No. 817,268, issued to me August 10, 1906, to which reference may be had for details not disclosed herein. The actuating mechanism comprises a nut 16 secured to the bearing 10 by studs 18 and cooperating with an axially disposed screw 20 having a head 22 which is usually turned by a lever not herein shown. The inner end of the screw engages the outer end of an axially arranged thrust pin 24 whose inner end engages a cross piece or key 26 mounted to slide axially in a slot 28 provided in the shaft 6. This cross piece engages a collar 30 which in turn abuts axially against a hub 32 of the drum 14. When, therefore, the screw 20 is turned in the proper direction, it operates through the thrust pin 24, cross piece 26 and collar 30 to move the drum 14 toward the left, Fig. 1, thereby causing engagement of the clutching surfaces presently to be described. The hub 32 has a bearing on the shaft which is lubricated by a usual grease cup 34. The drum has another hub 36 having a bearing on the shaft which is lubricated by a usual grease cup 38 from which a conduit 40 leads to the bearing surface.

Disengagement of the clutching surfaces is effected by a usual helically coiled spring 42 interposed between a yoke 44 and an adjacent hub 46 of the gear 12. Movement of the yoke under the influence of the spring is limited by stops conveniently in the form of nuts 48 threaded onto studs 50, the latter in turn being threaded into the yoke. Power is transmitted from the gear to the drum by a clutch having inner and outer annular parts, herein cones 52 and 54 presenting engaging surfaces through which the power is transmitted. Herein the inner cone is faced with a facing 56 of suitable material such as asbestos composition, preferably in sections such as shown in Fig. 5 suitably secured thereto as by rivets 58. An important feature of my invention is the provision for facilitating the renewal of the clutch facing. One factor in this is the provision of a chamber 60 having an open end 62 affording access to the inner ends of the rivets 58 whereby the latter may be easily cut off and driven out of place. Another factor is the provision of a sufficient space between the collar 30 and bearing 10 so that when the key or cross piece 26 is removed the drum may be backed away (toward the right in Fig. 1) until the outer cone 54 is entirely withdrawn from the inner cone, thereby affording access to the entire surface of the clutch facing 56 as well as the rivets. Thus it is apparent that the clutch facing when worn may be removed and replaced by a new one without the necessity of dismounting the entire mechanism.

Another important feature of my invention is the provision for preventing the bearing lubricant from reaching the clutching surfaces. To this end, the outer clutch member is provided with an annular inclined deflector 64, herein conveniently formed as an integral flange projecting laterally from a web 66 which connects the drum 14 with the outer cone 54, and this web is provided with one or more openings 68 communicating with the annular trough afforded by the flange. When, therefore, any lubricant is thrown outwardly against the flange 64, the latter assists the travel of the lubricant by the combined action of gravity and centrifugal force, and directs the lubricant through the openings 68 to the exterior of the clutch, where it cannot interfere with the proper working of the latter.

The inner clutch member also is provided with similar means to catch lubricant and to cause the same to pass out through the open end 62. The hub 46 and cone 52 are suitably connected together, as by a web herein presenting spokes 70, although spokes are not necessarily employed. Referring now to Fig. 4, each of the spokes has a conical surface 72, and any lubricant adhering thereto gravitates toward the middle. As the lubricant travels in an outward direction under the influence of centrifugal force, it encounters what I term a dam 74, conveniently formed as an integral flange, best shown in Fig. 3, which projects from the face of the spoke and is inclined outwardly in opposite directions from its central portion toward the adjacent openings 76 between the spokes, thereby directing the lubricant into said openings and causing the same to pass out through the chamber 60 and opening 62 without reaching the clutching surfaces, the course of the lubricant being indicated by the arrows in Figs. 1, 2 and 3. It should be observed that the lubricant deflecting means carried by one clutch member overlaps in an axial direction the deflecting means carried by the other, so that by their cooperative action lubricant is carried away and prevented from reaching the clutching surfaces.

Having thus described one embodiment of the invention without limiting myself thereto, what I claim and desire by Letters Patent to secure is:

1. In a clutch, the combination of a shaft, bearings therefor, inner and outer, frictionally engaging parts which are mounted on said shaft and transmit power from one to the other by reason of their frictional engagement, one of said parts being fixed to said shaft and the other slidable lengthwise thereon, a renewable lining affording the friction surface of said inner part, fastening members extending through said lining and said inner part to secure said lining to said inner part, the latter being hollow and having an open end affording access to the inner ends of said fastening members and space for their removal and replacement by manipulation within said space, and operating means for causing driving engagement of said parts by moving said slidable part lengthwise on said shaft, said operating means including a thrust member adapted to be displaced from its normal position to permit an abnormal movement of said slidable part toward the adjacent bearing to a position affording access to the outer ends of said fastening means.

2. In a clutch, the combination of a shaft, bearings therefor, inner and outer, frusto-conical engaging parts which transmit power from one to the other by reason of their frictional engagement, one of said parts being fixed to said shaft and the other slidable lengthwise thereon, said inner part having an annular wall encircling a chamber open to the exterior at the larger end of the frustum, a renewable lining affording the friction surface of said inner part, fastening members extending through said lining and said wall and having headed ends accessible through the open end of said chamber, and operating means for causing driving engagement of said parts by moving said slidable part lengthwise on said shaft, said operating means including a thrust member adapted to be displaced from its normal position to permit an abnormal movement of said slidable part toward the adjacent bearing to a position affording access to the outer ends of said fastening means.

3. In a clutch, the combination of a pair of cooperating clutch members having frictionally engaging surfaces by which the power is transmitted from one to the other, each of said members being provided with means independently of the others to catch surplus oil and each having an outlet to conduct oil to the exterior of the clutch thereby to prevent the same from reaching said surfaces.

4. In a clutch, the combination of a pair of cooperating clutch members having frictionally engaging surfaces by which the power is transmitted from one to the other, said members being provided, one with annular oil deflecting means and an outlet associated therewith to permit the escape of oil and the other with interrupted oil deflecting means spaced to permit the escape of oil, said means cooperating to prevent oil from reaching said surfaces.

5. In a clutch, the combination of a pair of cooperating clutch members having frictionally engaging surfaces by which the power is transmitted from one to the other, said members being provided, one with inner, annular oil deflecting means and the other with outer oil deflecting means about said inner means, and each member being provided with an opening associated with its deflecting means, for conducting away the oil deflected thereby independently of the deflecting means and opening of the other member.

6. In a clutch, the combination of a pair of cooperating clutch members having frictionally engaging surfaces by which the power is transmitted from one to the other, each of said members being provided with an opening and an oil deflector associated therewith to direct oil therethrough independently of the opening and deflector of the other member.

7. In a clutch, the combination of a pair of cooperating clutch members having frictionally engaging surfaces by which the power is transmitted from one to the other, one of said members being provided with a series of spokes separated by openings, each spoke presenting a dam inclined outwardly in opposite directions from its central portion toward adjacent openings to direct oil thereinto.

8. In a clutch, the combination of a pair of cooperating clutch members having frictionally engaging surfaces by which the power is transmitted from one to the other, said members being provided with radially inner and outer oil deflecting means, one overlapping the other in an axial direction, an oil outlet associated with said outer deflecting means, and an oil outlet associated with said inner deflecting means.

In testimony whereof, I have signed my name to this specification.

ALMON E. NORRIS.